(12) United States Patent
Schlutter et al.

(10) Patent No.: US 10,274,091 B2
(45) Date of Patent: Apr. 30, 2019

(54) GATE VALVE FOR A CHEMICAL PLANT

(71) Applicant: Paul Wurth S.A., Luxembourg (LU)

(72) Inventors: Alexander Schlutter, Sankt Ingbert (DE); Rainer Schmitz, Langerwehe (DE)

(73) Assignee: PAUL WURTH S.A., Luxembourg (LU)

( * ) Notice: Subject to any disclaimer, the term of this patent is extended or adjusted under 35 U.S.C. 154(b) by 0 days.

(21) Appl. No.: 15/725,100

(22) Filed: Oct. 4, 2017

(65) Prior Publication Data

US 2018/0094731 A1    Apr. 5, 2018

(30) Foreign Application Priority Data

Oct. 4, 2016    (EP) ..................... 16192279

(51) Int. Cl.
*F16K 3/20* (2006.01)
*C10B 25/08* (2006.01)
*F16K 3/02* (2006.01)

(52) U.S. Cl.
CPC .............. *F16K 3/207* (2013.01); *C10B 25/08* (2013.01); *F16K 3/0227* (2013.01)

(58) Field of Classification Search
CPC ........ F16K 3/207; F16K 3/0227; C10B 25/08
See application file for complete search history.

(56) References Cited

U.S. PATENT DOCUMENTS

| 3,863,667 | A | * | 2/1975 | Ward | F16L 55/105 |
| | | | | | 137/318 |
| 5,116,022 | A | | 5/1992 | Genreith et al. | |
| 6,565,714 | B2 | | 5/2003 | Lah | |
| 6,660,131 | B2 | | 12/2003 | Lah | |
| 6,964,727 | B2 | | 11/2005 | Lah | |
| 9,482,347 | B2 | * | 11/2016 | Elliott et al. | F16K 47/08 |

* cited by examiner

*Primary Examiner* — Kevin Lee
(74) *Attorney, Agent, or Firm* — Cantor Colburn LLP

(57) ABSTRACT

A gate valve for a chemical plant including a valve housing having an upper opening and an opposite lower opening; an upper sealing seat and a lower sealing seat disposed on the valve housing; a valve gate movably disposed in the valve housing, for blocking a path between the openings in a closed position and opening said path in an open position, the valve gate comprising a first plate having lower surface with a blind recess and a second plate at least partially disposed in the blind recess; wherein, in the closed position, the upper sealing seat sealingly engages the first plate, the lower sealing seat sealingly engages the second plate and the second plate is at least indirectly in contact with the first plate.

15 Claims, 3 Drawing Sheets

GATE VALVE FOR A CHEMICAL PLANT

CROSS REFERENCE TO RELATED APPLICATION

This application is related to and claims the benefit of European Patent Application Number 16 192 279.4 filed on Oct. 4, 2016, the contents of which are incorporated herein by reference in their entirety.

TECHNICAL FIELD

The disclosure relates to a gate valve for a chemical plant, in particular in the refinery and petrochemical industries. The gate valve is of particular use in connection with coker drums, which convert liquid residual oil into solid petroleum coke.

BACKGROUND

In many chemical plants, a vessel needs to be temporarily closed, e.g. separated from an adjacent vessel, by an appropriate valve. In a closed position, the valve prevents solid, liquid and/or gaseous chemicals from entering and/or escaping from the vessel, while in an open position, the valve provides an opening for these chemicals. In many applications, e.g. in the petrochemical industry, the valve needs to withstand not only potentially aggressive chemical substances, but also high pressure and/or very high temperatures. Especially the latter condition presents a high challenge to the sealing properties of the valve.

One example for such extreme conditions is in the hydrocarbon processing industry, where valuable products are recovered from heavy residual oil by a process known as "delayed coking". The residual oil is heated by a furnace and fed into a coke drum. In the process, heavy hydrocarbons are partially cracked to produce lighter substances that may be recovered from the vapors exiting the coke drum. On the other hand, an increasing amount of coke remains in the coke drum. When the coke drum is full, it is cooled and the coke is removed. According to a well-known design, the coke drum is connected to a gate valve on its upper side and its lower side. The removal of the coke is carried out by opening the upper and lower gate valve, also known as de-heading, and cutting the coke from the upper drum opening using a high-pressure jet of water.

During the coking process, the lower gate valve is subjected to extreme temperatures and/or severe pressure, which can lead to serious deformations and may cause leakage of hazardous gases. In particular, the part of the valve that faces the coke drum is subjected to high temperatures of several hundred degrees Celsius, while the parts facing away from the coke drum are subjected to relatively moderate conditions.

Among the gate valves used today for de-heading coke drums, two different designs can be distinguished: single gate valves and double gate valves. The single gate design, which is e.g. described in U.S. Pat. Nos. 6,660,131, 6,565, 714 or 6,964,727, employs a single gate that is movably disposed within a valve housing. The valve housing has a pair of opposite openings and a path between these openings is either closed by the gate or opened if a through-hole of the valve gate is placed in the path. This design is compact and light. However, the extreme temperature differences acting on the single gate lead to thermal deformation which makes it difficult to achieve a tight seal. At least one floating dynamic, live loaded seat is provided to act against at least one side of the gate. Such a floating dynamic, live loaded seat is continuously loaded against the gate to provide a biased relationship between the seat and the blind. The function of the dynamic, live loaded seat is also to provide point to point fine tuning of the system. The sealing seat is permanently pressed onto the gate and intense friction occurs when the gate is moved between the open and the closed position, which leads to increased abrasion and necessitates high drive forces. Further disadvantages are leakage and the need for an extensive amount of purge steam.

The double gate design, which is e.g. described in U.S. Pat. No. 5,116,022, employs two gates disposed parallel above each other, each of which engages a separate sealing seat in the closed position, so that a redundant seal is achieved. Also, each of the gates, which are spaced-apart and normally connected by intermediate spring elements, is subjected to rather moderate temperature gradients, which leads to reduced thermal deformation. Furthermore, the lower gate is not subjected to significant pressure. The gates are pressed onto their respective sealing seats by a wedge mechanism disposed between them and the pressing force is released when the gates are moved to the open position. Since there is no permanent pressing force, the above-mentioned friction problems can be avoided. However, this design is rather complex, heavy and bulky.

BRIEF SUMMARY to the disclosure provides a gate valve with a rather simple design and reliable sealing properties.

The disclosure relates to a gate valve for a chemical plant. The term "chemical plant" is to be understood in a broad sense and refers to any plant for processing chemical substances. In particular, this refers to refinery plants and petrochemical plants. Usually, the gate valve is configured to be connected to a vessel that contains a chemical substance during operation. In particular, the gate valve may be used as bottom de-heading valve for a coke drum. It may especially be used in an environment where at least a part of the valve is subjected to high temperatures, e.g. over 200° C. or over 400° C., in particular about 500° C.

The gate valve comprises a valve housing having an upper opening and an opposite lower opening. The terms "upper" and "lower" merely serve to define a reference system and are not to be construed as limiting. In other words, the upper (lower) opening may be considered as a first (second) opening. In this context, the "vertical" direction is the direction from the upper opening to the lower opening. Normally, the upper opening is disposed above the lower opening with respect to the direction of gravity. However, other orientations are within the scope of the disclosure. In any case, the two openings are opposite to each other, i.e. they are located on opposite walls of the valve housing. Depending on the intended use of the gate valve, the valve housing may be made of materials that can withstand high temperatures and/or aggressive chemical environments. Stiffening ribs may be disposed on the outer surface of the valve housing. In general, the openings may have a variety of shapes, but in many cases, both openings are circular.

Further, the gate valve comprises an upper sealing seat and a lower sealing seat disposed on the valve housing. The upper sealing seat may be disposed circumferentially around the upper opening and the lower sealing seat may be disposed circumferentially around the lower opening. Corresponding to the above-mentioned circular form of the openings, each of the sealing seats may be circular or annular. Each of the sealing seats may be formed integrally with the valve housing, but, as will be explained below, is preferably formed as at least one element separate from the valve housing. In order to perform the sealing function, each sealing seat is normally formed as a single piece. Preferably, the upper sealing seat is fixedly disposed on the valve housing, while the lower sealing seat is moveably disposed on the valve housing.

The gate valve also comprises a valve gate movably disposed in the valve housing, for blocking a path between the openings in a closed position and opening said path in an open position. The valve gate can be moved by a rod or the like that extends to the outside of the valve housing and is actuated by a motor which e.g. may be driven hydraulically, pneumatically, electrically, manually, or any combination thereof. Normally, the valve gate is disposed for linear movement in a horizontal or lateral direction, i.e. perpendicular to the vertical direction between the upper and the lower opening.

The valve gate comprises a first plate having a lower surface with a blind recess and a second plate at least partially disposed in the blind recess. The lower surface is of course the surface facing the lower opening, while an upper surface faces the upper opening. The lower surface may in particular be designed to face away from a chemical reactor like a coke drum. Normally, the first plate has an overall flat and planar shape. For the most part, the thickness of the first plate may be constant. However, in the area with the blind recess, the thickness is reduced, e.g. by 30 to 70%. However, the thickness is not reduced to zero, i.e. the blind recess is to be distinguished from a through-hole and does not extend all the way through the first plate. Preferably, the second plate is entirely disposed in the blind recess, so that it does not extend downwards to protrude beyond the lower surface of the first plate. In particular, a lower surface of the second plate and the lower surface of the first plate adjacent the blind recess may align horizontally.

In the closed position, the upper sealing seat sealingly engages the first plate, the lower sealing seat sealingly engages the second plate and the second plate is at least indirectly in contact with the first plate. Herein, "sealingly" means that solid, liquid and gaseous material is hindered from passing between the respective sealing seat and the plate so that either no such material or only a negligible amount can pass. Preferably, the respective seal can also be gas-tight. The second plate is at least indirectly (i.e. via an intermediate element) in contact with the first plate, which means that a force can be transmitted between the first and second plate. In particular, this may be the vertical force (or rather a force couple), by which the second plate presses upwards against the first plate and the first plate presses downwards against the second plate. In other words, each of the plates serves as an abutment for the other plate. Indeed, both plates, the first and second plates, act independently from one another. The force from the first plate is guided via the guiding plate into the body of the valve housing. Sealing force of second plate, on the other hand is achieved by pushing the second plate into the recess of the first plate via the lower sealing seat alignment by means of the clamping device.

According to the disclosure, there are basically two functionally independently working seals, one that is formed by the upper sealing seat and the first plate and another one that is formed by the lower sealing seat and the second plate. Also, since the first and second plate are two separate elements, any possible thermal and/or pressure-induced distortion of one plate does not necessarily affect the other plate, wherefore it is less likely that both plates are inadvertently disengaged from the respective sealing seat. Also, in an application where the first plate is facing a high-temperature environment like a coke drum, the second plate may be at least partially shielded from high temperatures and/or pressure, making deformation less likely. Furthermore, since the thickness of the first plate in the region of the blind recess is reduced, temperature differences between the upper surface and the lower surface are normally smaller than in a thicker plate, which also reduces thermal deformation.

It is preferred that a clearance exists between the first and second plate. Such a clearance may be restricted to a portion of the area between the two plates. For example, the first plate may be in contact with the second plate in a relatively small area, whereas apart from this area, the two plates are spaced apart. In particular, such a clearance may be in communication with an inlet of the valve housing for introducing a purging medium (e.g. steam) into the valve housing and with an outlet of the valve housing for releasing the purging medium. Furthermore, such a clearance serves to thermally isolate the first and second plate from each other, so that temperatures existing in the first plate have little influence on the second plate and vice versa. Therefore, thermal distortions can be significantly reduced. Also, even if one of the plates is distorted by excessive temperature differences, this may not influence the other plate. Therefore, since the sealing concept of the inventive gate valve can be considered as redundant, it can be assumed that at least one of the two seals will remain intact.

Also, it is preferred that the second plate is in direct contact with the first plate. In other words, the second plate is directly supported by the first plate and vice versa, so that tightening forces are directly transferred from one plate to the other without any intermediate element. This helps to reduce the total number of elements in the gate valve, thereby simplifying operation and maintenance. In particular, there is no need for any springs or other suspension elements between the two plates, which may deteriorate during the operation of the gate valve. It should be noted that this embodiment is preferably combined with the embodiment where a clearance exists between the first and second plate, i.e., the two plates are in contact only in a limited contact area, whereas they are spaced apart in other areas. To this effect, spacer elements may be arranged between the first and second plate. In particular, in order to reduce heat transfer between the plates and to facilitate the flow of a purging medium, the contact area may be rather small with respect to the total surface of the second plate, e.g. less than 10% or less than 5%.

According to one embodiment, one plate has a vertically projecting portion which is at least partially disposed in a recessed portion of the other plate. Here, the projecting portion and the recessed portion correspond with each other to provide at least a partial form fit between the first and second plate. In particular, since the projecting portion projects vertically, such form fit may hinder or prevent lateral movement of the two plates. In general, the projecting portion and the recessed portion facilitate proper alignment of the two plates. It should be noted that a horizontal dimension of the projecting portion may be greater than a vertical dimension thereof. The recessed portion may be sized larger than the projecting portion, in order to allow for some relative movement.

There are several possible shapes for the projecting portion. According to one embodiment, the projecting portion is at least partially dome-shaped. In other words, at least a part of the projecting portion is convex, e.g. spherical. Correspondingly, the recessed portion may at least partially be concave. In this case, the recessed portion may be shaped complementary to the projecting portion or it may be larger in size. In each case, it is conceivable, that the dome-shaped projecting portion and the recessed portion act similar to a spherical joint, which allows for a—possibly minimal—tilting of the second plate relative to the first plate. Of course, this is only possible if there is a clearance between the two plates.

In one embodiment, the projecting portion may be disposed on the first plate. In another embodiment, the projecting portion is disposed on the second plate. Here, the recessed portion is disposed on the first plate, more particularly in the blind recess. In applications where the upper side of the first plate is subjected to high temperatures, like in delayed coking, it may be relevant that the thickness of the first plate is reduced not only by the blind recess but also by the recessed portion located therein. This reduced thickness will help to establish a more uniform temperature distribution within the first plate and therefore help to reduce thermal distortions.

It is conceivable that the upper sealing seat is supported by the first plate, which is supported by the second plate, which in turn is supported by the lower sealing seat, so that a flow of force runs upper sealing seat to the first plate, the second plate and finally to the lower sealing seat. However, in another embodiment, a guiding plate is disposed on the valve housing to engage the lower surface of the first plate adjacent the blind recess. Thus, the first plate is supported by the guiding plate, which receives forces resulting from the weight of the first plate as well as the upper sealing seat pressing on the first plate. This embodiment also enables the lower sealing seat to be removed from the second plate without any influence on the first plate, since the latter is supported by the guiding plate. It should be noted that the guiding plate is the supporting element for the first plate in a sealing manner, in constant contact in all positions (open/intermediate/closed) with the first plate to achieve sealing of upper seat. The guiding plate does not have to be continuous, but may consist of several pieces or, in other words, there may be a plurality of guiding plates. The guiding plate may be formed as a single piece with the valve housing or it may be a separately manufactured element, which is disposed on and supported by the valve housing. The guiding plate may be disposed radially outside the lower sealing seat.

In order to ensure that the upper sealing seat sealingly engages the first plate, it is preferred that the upper sealing seat is pretensioned against the first plate. The upper sealing seat may be pretensioned by some elastically deformed element so that it exerts a force on the upper surface of the first plate. In particular, this embodiment may be combined with the above-mentioned embodiment where the first plate is supported by a guiding plate. Also, in applications like delayed coking, where the upper surface of the first plate usually becomes encrusted with residues of a chemical of physical process, it is necessary or at least desirable to scrape the surface. If the upper sealing seat is permanently pretensioned against the first plate, this scraping can be performed reliably by the sealing seat as the valve gate moves sideways to the open position.

Normally, any uneven distribution of forces or temperature detrimental to the lifespan of the gate valve. To some extent, and even distribution can be achieved by a symmetric configuration of the components. Thus, it is preferred that the openings, the upper sealing seat, the lower sealing seat, the blind recess, the second plate, the recessed portion and/or the projecting portion are symmetric about a common symmetry axis. In particular, the blind recess, the recessed portion and the projecting portion may be symmetric about a common symmetry axis. As far as parts of the movable valve gate are considered, they are symmetric about the same axis as the stationary components when the gate valve is in the closed position. It is understood that preferably all of the above-mentioned components are symmetric about the same symmetry axis, but it is also possible that only some of them have this kind of symmetry.

It is within the scope of the disclosure that the lower sealing seat is part of the valve housing. However, it is preferred that the lower sealing seat is separate from the valve housing, i.e. formed as a separate element. Thus, thermal deformations of the valve housing have only limited impact on the lower sealing seat. This greatly improves the sealing effect. In particular, the lower sealing seat may be movable or floating with respect to the valve housing.

To improve the sealing effect between the lower sealing seat and the second plate, it is also preferred that a clamping device is arranged to exert a clamping force on the lower sealing seat in the closed position. It is understood that such a clamping force acts to press the lower sealing seat against the second plate, i.e. this clamping force is directed upwards, wherefore the clamping device is normally disposed below the lower sealing seat. Of course, this embodiment is normally used in a case where the lower sealing seat is floating with respect to the valve housing. It should be noted that by the contact between the second plate and the first plate, this force may further act on the first plate and increase the force acting between the first plate and the upper sealing seat. The clamping device may consist of a plurality of individual elements.

In a preferred embodiment, the clamping device is pretensioned against the lower sealing seat and is releasable by at least one actuator. For instance, the clamping device may be pretensioned by at least one spring element acting on a rod which in turn exerts a force on the lower sealing seat. By this pretensioning, the sealing effect can be further enhanced. However, when the valve gate is to be moved from the closed position to the open position (and vice versa), it may be desirable to release the clamping force, thereby reducing mechanical stress and friction. Thus, at least one actuator is disposed to release the clamping device. Such an actuator creates a force opposite to the pretensioning force e.g. created by the at least one spring element.

Thus, the clamping device is configured to essentially have two operating positions: In an engaged position, the lower sealing seat is pressed against either the first plate when the valve gate is in its open position or the second plate when the valve gate is in its closed position. In a disengaged position, the lower sealing seat is not pressed against the first or second plate, thereby allowing easy movement of the valve gate between its open and closed positions. In other words, the clamping device can be interpreted as an "ON/OFF" system. This is in clear contrast to an "always ON" system as e.g. disclosed in U.S. Pat. Nos. 6,660,131, 6,565,714 or 6,964,727, wherein the lower sealing seat is continuously pressed against the valve gate, while the floating dynamic, live loaded seat provides fine tuning of the clamping force.

According to another preferred embodiment, the at least one actuator is a hydraulic actuator. In this case, all actuators can be operated by increasing or decreasing the hydraulic pressure in a single distribution system. For instance, the actuator may comprise a cylinder in which a plunger is disposed. A part of the cylinder on one side of the plunger may be connected to an inlet for hydraulic fluid, while a spring element is disposed in the other side of the plunger. If the hydraulic pressure is reduced, the spring element moves the plunger in one direction, while an increasing hydraulic pressure moves the plunger in the opposite direction. The above-mentioned rod (or a similar element) may be connected to the plunger in order to exert a force on the lower sealing seat. Even in the case of a loss of hydraulic pressure, the function of the clamping element is guaranteed and the sealing will be maintained. As an alternative to the hydraulic actuator, pneumatic, electrical, manual actuators may also be envisaged.

As mentioned above, the first plate comprises a through-hole, which is disposed between the upper and lower openings in the open position, whereby the path between the openings is opened. In this open position, it is preferred the upper sealing seat and the lower sealing seat engage the first plate adjacent the through-hole. To facilitate this embodiment, the vertical dimension (i.e., the thickness) of the first plate adjacent the through-hole may correspond to the total vertical dimension of the first plate and the second plate at the blind recess. Thus, the lower sealing seat can engage the second plate in the closed position and the first plate in the open position.

BRIEF DESCRIPTION OF THE DRAWINGS

Preferred embodiments will now be described, by way of example, with reference to the accompanying drawings, in which.

DESCRIPTION OF PREFERRED EMBODIMENTS

Figure 1:
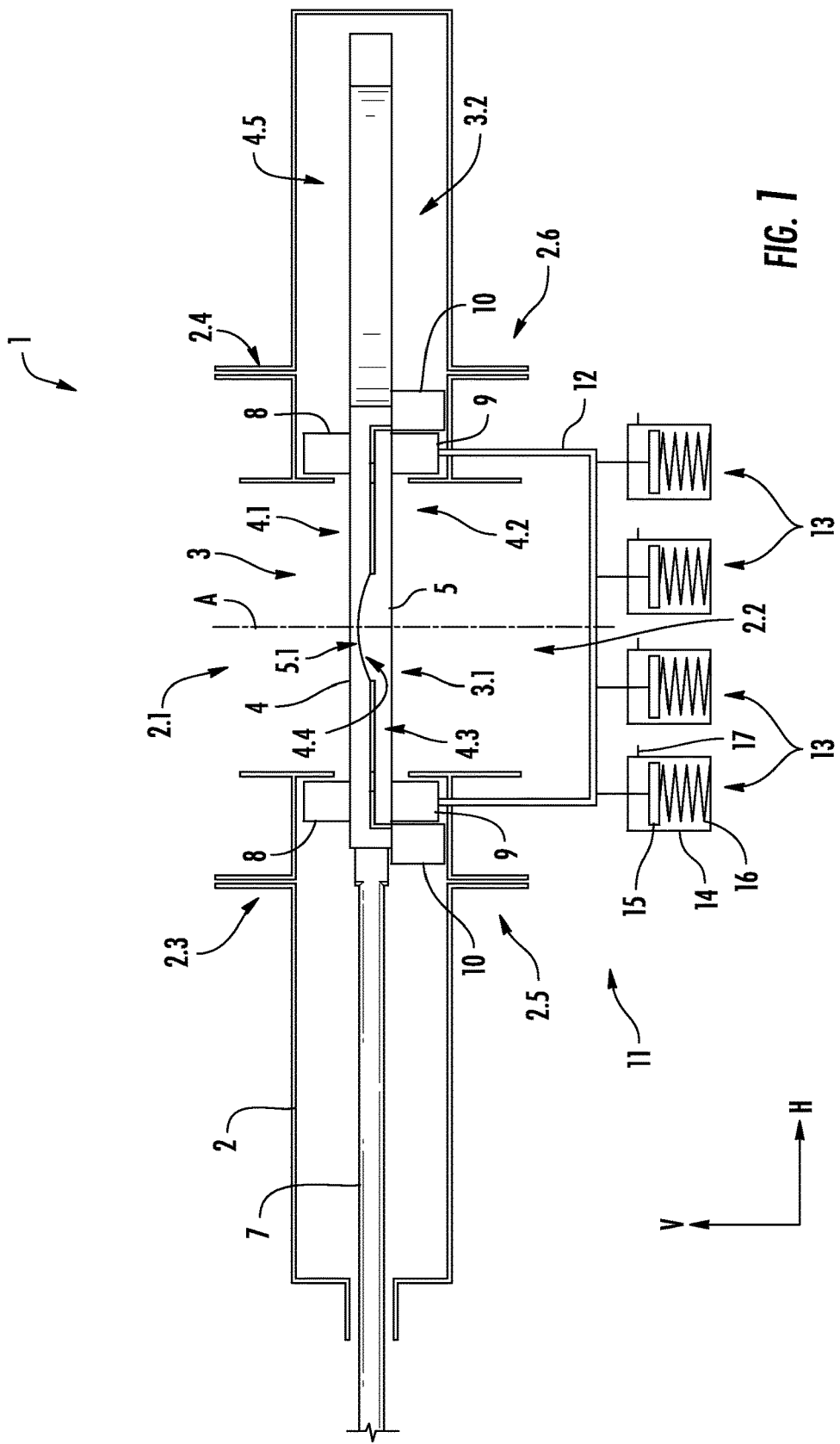
FIG. 1 is a schematic representation of an embodiment of a gate valve in a closed position.

FIG. 1 shows an embodiment of a gate valve 1 according to the present disclosure. The gate valve 1 shown here may for example be used as a bottom de-heading valve for a coke drum. A valve gate 3 is disposed within a valve housing 2. The valve housing 2 has a circular upper opening 2.1 and a likewise circular lower opening 2.2. During operation, the upper opening 2.1 may be connected to the lower part of the coke drum. The valve housing 2 also has a plurality of flanges 2.3, 2.4, 2.5, 2.6 to connect together different portions of the valve housing 2. The valve housing 2 also has at least one steam inlet (not shown) and at least one steam outlet (not shown), which are used to inject steam into the valve housing 2 and release steam and condensate from the valve housing 2, respectively.

While the upper and lower opening 2.1, 2.2 are arranged above each other along a vertical direction V, the valve gate 3 is movable along a horizontal direction H by means of a rod 7, which is connected to an actuator (which is not shown here). The valve gate 3 comprises a blocking region 3.1 for blocking a path between the openings 2.1, 2.2 and a pass-through region 3.2 for opening the path. The valve gate 3 comprises a first plate 4, which is connected to the rod 7. The first plate 4 faces the upper opening 2.1 with an upper surface 4.1 and faces the lower opening 2.2 with a lower surface 4.2. The first plate 4 extends over the blocking region 3.1 and the pass-through region 3.2. In the blocking region 3.1, the first plate 4 has a blind recess 4.3 in the lower surface 4.2. In the region of the blind recess 4.3, the vertical thickness of the first plate 4 is reduced by approximately 50%. In the center of the blind recess 4.3, the first plate 4 has a concave recessed portion 4.4. Horizontally spaced apart from the blind recess 4.3, the first plate 4 also has a circular through-hole 4.5. In the pass-through region 3.2, the first plate 4 has a through-hole 4.5. The valve gate 3 is movably disposed within the valve housing 2 between a closed position wherein blind recess 4.3 of the blocking region 3.1 is in alignment with the openings 2.1, 2.2 and an open position wherein the through-hole 4.5 of the pass-through region 3.2 is in alignment with the openings 2.1, 2.2.

The valve gate 3 further comprises a second plate 5, which is disposed in the blind recess 4.3 of the first plate 4. The second plate 5 is in direct contact with the first plate 4 by a dome-shaped, vertically projecting portion 5.1, which is disposed in the recessed portion 4.4. Apart from this contact, the two plates 4, 5 are spaced apart by a clearance. One function of this clearance is to allow steam injected through one of the steam inlet to pass between the plates 4, 5. Another function is to allow for a minimal tilting movement of the second plate 5 relative to the first plate 4. In order to facilitate such tilting movement, the curvature of the projecting portion 5.1 is a little smaller than the curvature of the recessed portion 4.4. Also, due to the clearance, the thermal contact between the two plates 4, 5 is minimal, which allows each of the plates 4, 5 to have a rather homogeneous temperature distribution, which has only limited influence on the other plate 4, 5. A homogeneous temperature distribution is also facilitated by the relatively small thickness of each of the plates 4, 5. Pressure and thermal-induced deformation of the first plate 4 does not necessarily affect the second plate 5.

FIG. 1 shows a closed position of the gate valve 1. In this position, an annular upper sealing seat 8 is in contact with the upper surface 4.1 of the first plate 4. In order to sealingly engage the first plate 4, the upper sealing seat 8 is pretensioned against it. Due to this sealing effect, solid, liquid and/or gases material cannot pass from the upper opening 2.1 to the inside of the valve housing 2 or to the lower opening 2.2. A part of the lower surface 4.2 adjacent the blind recess 4.3 rests upon an annular guiding plate 10, which is connected to the valve housing 2. Thus, there is a flow of force from the upper sealing seat 8 through the first plate 4 to the guiding plate 10.

Below the valve gate 3 and radially inside the guiding plate 10, an annular lower sealing seat 9 sealingly engages the second plate 5. In order to intensify the sealing effect, a clamping device 11 exerts a clamping force on the lower sealing seat 9. This clamping force is essentially directed upwards. The clamping device 11, which is shown here schematically, comprises a pushrod assembly 12, which directly acts on the lower sealing seat 9 and is connected to a plurality of plungers 15 that are part of actuators 13. Each actuator 13 comprises a cylinder 14 which is connected to a hydraulic supply 17. As hydraulic pressure is exerted via the hydraulic supply 17, a force acts on the upper side of the plunger 15. The lower side of the plunger 15 is connected to a pretensioned spring element 16 which exerts an upward force. In the position shown in FIG. 1, the hydraulic pressure is rather low, so that the plungers 15 are pushed upwards by the spring elements 16 and exert a force on the lower sealing seat 9 via the pushrod assembly 12. It is understood that the force acting on the lower sealing seat 9 further acts on the second plate 5 and (by the direct contact of the projecting portion 5.1 and the recessed portion 4.4) on the first plate 4. In other words, the first plate 4 serves as an abutment for the second plate 5.

In the embodiment shown here, the openings 2.1, 2.2, the blind recess 4.3, the recessed portion 4.4, the second plate 5, the projecting portion 5.1 and the sealing seats 8, 9 are symmetric with respect to a symmetry axis A, which is in parallel to the vertical direction V.

Since the upper sealing seat 8 sealingly engages the first plate 4 and the lower sealing seat 9 sealingly engages the second plate 5, the gate valve 1 basically has two independent, redundant seals. Also, since the lower sealing seat 9 is movable relative to the valve housing 2, thermal and pressure deformations of the valve housing 2 will not influence the sealing properties of the lower sealing seat 9.

Figure 2:
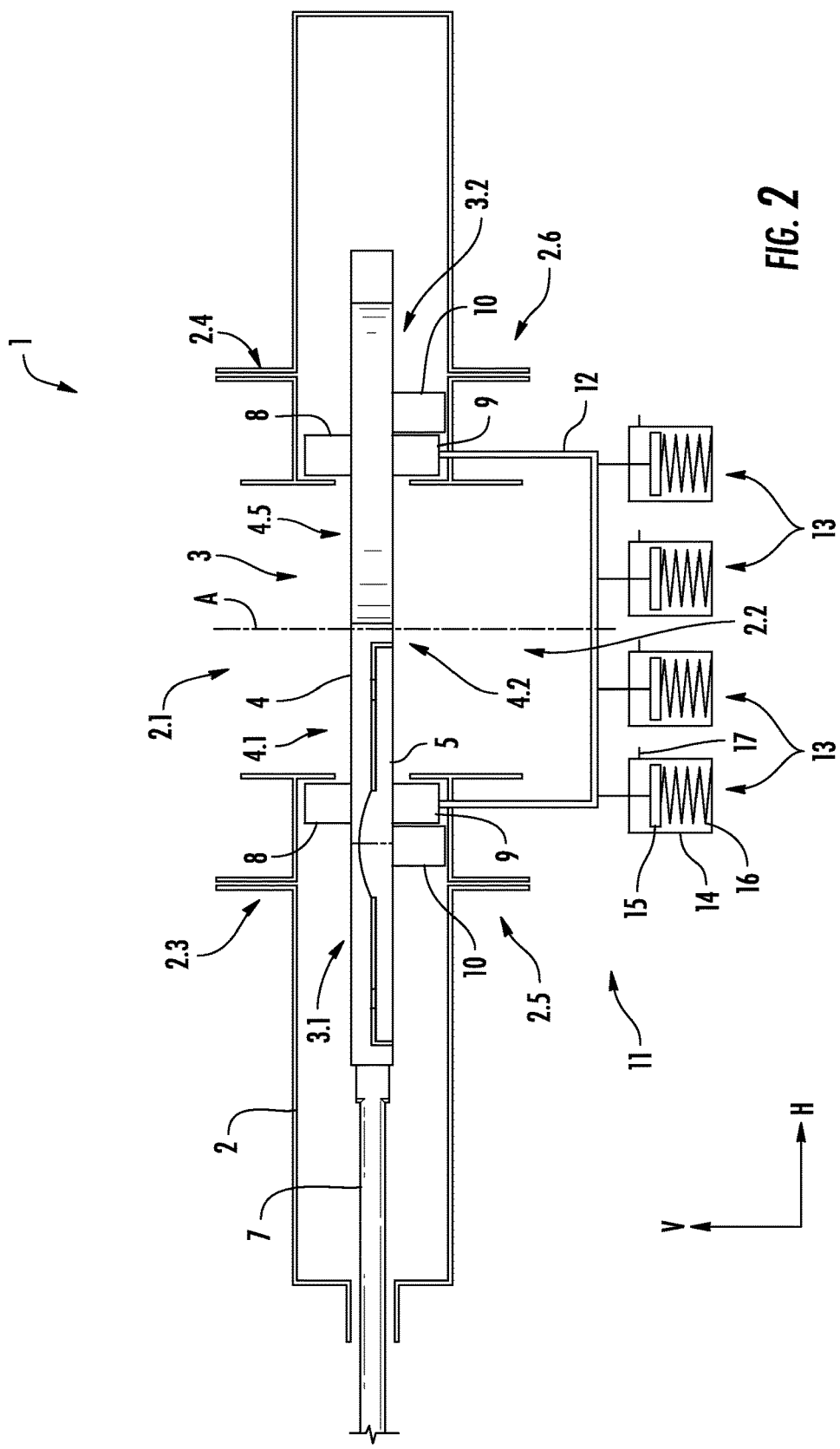
FIG. 2 is a schematic representation of the gate valve of FIG. 1 in an intermediate position.
Figure 3:
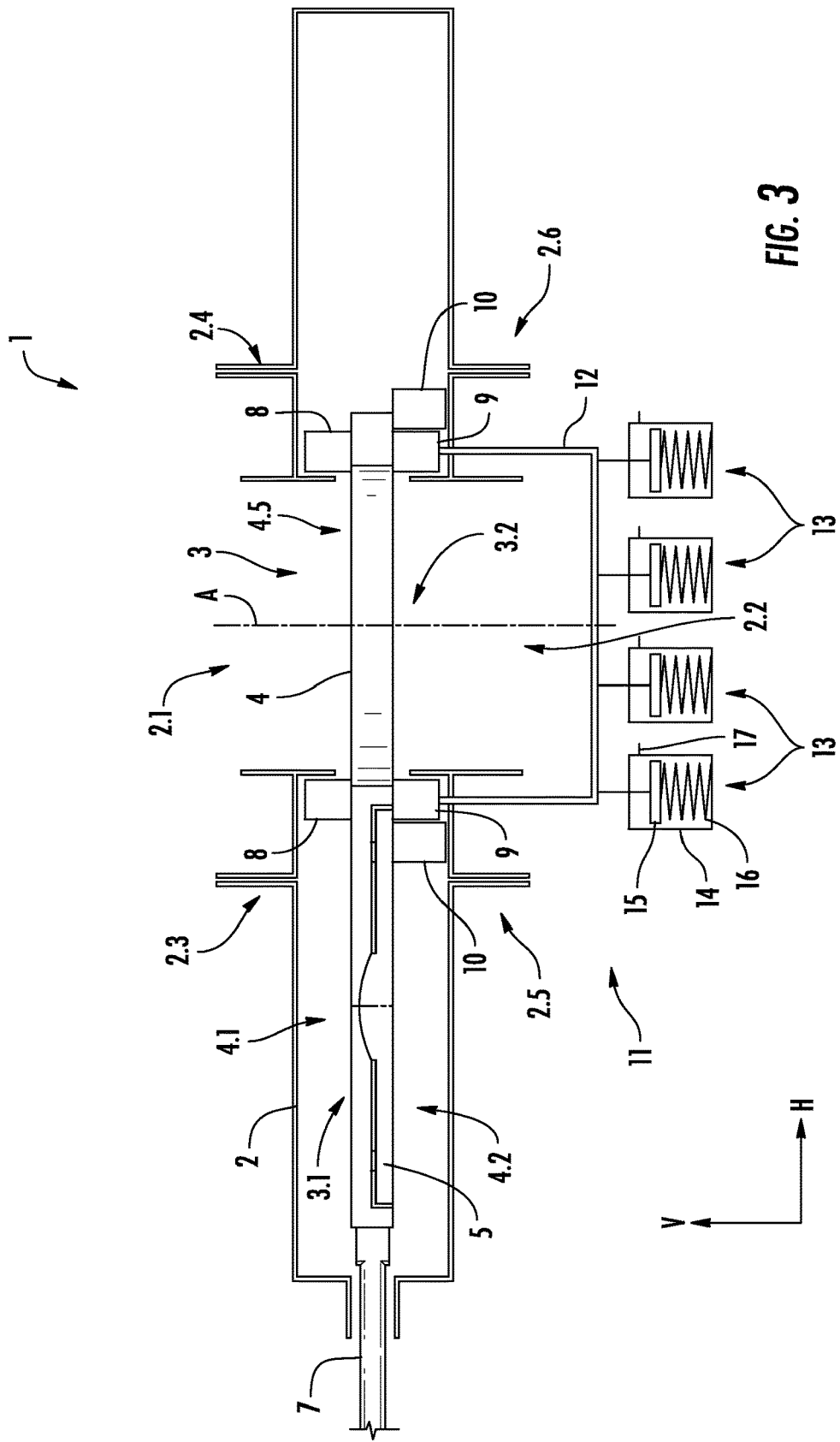
FIG. 3 is a schematic representation of the gate valve of FIG. 1 in an open position.

FIG. 2 shows an intermediate position of the gate valve 1, where the valve gate 3 is moved laterally from the closed position of FIG. 1 towards an open position as shown in FIG. 3. During this intermediate phase, the upper sealing seat 8 is still pretensioned against the upper surface 4.1 of the first plate 4, which results in a scraping effect, i.e. a removal of any solid and/or liquid material remaining on the upper surface 4.1. If the gate valve 1 is used for de-heading of a coke drum, such material may in particular be coke generated during the delayed coking. Before the valve gate 3 begins to move laterally, the hydraulic pressure in the cylinders 14 is increased to overcome the force of the spring elements 16, so that the pushrod assembly 12 relieves the lower sealing seat 9 from the valve gate 3. During this phase, no sealing effect is required and relieving the lower sealing seat 9 helps to avoid unnecessary friction. Essentially, the clamping device 11 has two operating positions: an engaged position and a disengaged position. In the engaged position, the lower sealing seat 9 is pressed against either the first plate 4 or the second plate 5 depending on whether the valve gate 3 is in its open or closed position. In the disengaged position, the lower sealing seat 9 is not pressed against the first or second plate 4, 5, thereby allowing easy movement of the valve gate 3 between its open and closed positions.

FIG. 3 shows an open position of the gate valve 1, where the circular through-hole 4.5 is placed between the upper and lower opening 2.1, 2.2. In this open position, it may be desirable to seal the inside of the valve housing 2 from any material passing through the openings 2.1, 2.2. Therefore, the lower sealing seat 9 is moved and pressed against the lower surface 4.2 by reducing the hydraulic pressure in the cylinders 14. As can be seen in FIG. 3, the upper sealing seat 8 and the lower sealing seat 9 sealingly engage the first plate 4 adjacent the through-hole 4.5. As can be seen from FIGS. 1 to 3, a vertical dimension (i.e., the thickness) of the first plate 4 adjacent the through-hole is approximately equal to the total vertical dimension of the first plate 4 and the second plate 5 at the blind recess 4.3. Thus, the lower sealing seat 9 can engage the second plate 5 in the closed position and engage the first plate 4 in the open position.

The invention claimed is:

1. A gate valve for a chemical plant, comprising
a valve housing having an upper opening and an opposite lower opening;
an upper sealing seat and a lower sealing seat disposed on the valve housing;
a valve gate comprising a blocking region for blocking a path between the openings and a pass-through region for opening said path, the valve gate comprising a first plate extending over said blocking region and said pass-through region, wherein said first plate has, within said blocking region thereof, a lower surface with a blind recess, a second plate being at least partially disposed in said blind recess, and wherein said first plate has, within said pass-through region thereof, a through-hole, the valve gate being movably disposed within said valve housing between a closed position wherein said blocking region is in alignment with said openings and an open position wherein said pass-through region is in alignment with said openings;
wherein, in the closed position, the upper sealing seat sealingly engages the blocking region of the first plate and the lower sealing seat sealingly engages the second plate arranged in the blind recess of the blocking region of the first plate and the second plate is at least indirectly in contact with the first plate;
wherein, in the open position, the upper sealing seat sealingly engages the pass-through region of the first plate and the lower sealing seat sealingly engages the pass-through region of the first plate.

2. The gate valve according to claim 1, wherein said upper sealing seat is fixedly disposed on the valve housing and said lower sealing seat is moveably disposed on the valve housing, said lower sealing seat being movable between an engaged position and a disengaged position.

3. The gate valve according to claim 1, further comprising a clearance between the first and second plate.

4. The gate valve according to claim 3, wherein the second plate is in direct contact with the first plate.

5. The gate valve according to claim 1, wherein one of the first and second plates has a vertically projecting portion which is at least partially disposed in a recessed portion of the other plate.

6. The gate valve according to claim 5, wherein the projecting portion is at least partially dome-shaped.

7. The gate valve according to claim 5, wherein the projecting portion is disposed on the second plate.

8. The gate valve according claim 1, wherein a guiding plate is disposed on the valve housing to engage the lower surface of the first plate adjacent the lower opening.

9. The gate valve according to claim 1, wherein the upper sealing seat is pretensioned against the first plate.

10. The gate valve according to claim 5, wherein the openings, the upper sealing seat, the lower sealing seat, the blind recess, the second plate, the recessed portion and/or the projecting portion are symmetric about a common symmetry axis.

11. The gate valve according to claim 1, wherein a clamping device is arranged to exert a clamping force on the lower sealing seat in the open or closed position of the valve gate.

12. The gate valve according to claim 11, wherein the clamping device is pretensioned against the lower sealing seat and is releasable by at least one actuator.

13. The gate valve according to claim 12, wherein the at least one actuator is a hydraulic actuator.

14. The gate valve according to claim 11, wherein said clamping device is arranged to release said clamping force on the lower sealing seat for moving said valve gate between its open and closed positions.

15. The gate valve according to claim 1, wherein the lower sealing seat is separate from the valve housing.

\* \* \* \* \*